United States Patent [19]

Bourne et al.

[11] Patent Number: 5,964,291

[45] Date of Patent: Oct. 12, 1999

[54] WELL TREATMENT

[75] Inventors: Hugh Malcolm Bourne, Wimborne; Peter Arne Read, Dorchester, both of United Kingdom

[73] Assignee: AEA Technology plc, Didcot, United Kingdom

[21] Appl. No.: 08/608,247

[22] Filed: Feb. 28, 1996

[30] Foreign Application Priority Data

Feb. 28, 1995 [GB] United Kingdom .................. 95-03949

[51] Int. Cl.$^6$ .......................... E21B 41/02; E21B 43/267
[52] U.S. Cl. ......................... 166/279; 166/280; 166/902; 507/902; 507/924
[58] Field of Search .................................... 166/279, 280, 166/310, 902; 507/902, 924

[56] References Cited

U.S. PATENT DOCUMENTS

| | | |
|---|---|---|
| 2,760,584 | 8/1956 | Rohrback . |
| 2,879,847 | 3/1959 | Irwin ........................................ 166/279 |
| 3,072,192 | 1/1963 | Van Poollen . |
| 3,179,170 | 4/1965 | Burtch . |
| 3,199,591 | 8/1965 | Keplet ..................................... 166/279 |
| 3,283,817 | 11/1966 | Roberts . |
| 3,531,409 | 9/1970 | Seffens et al. ....................... 166/279 X |
| 3,756,949 | 9/1973 | Schreurs .............................. 166/311 X |
| 3,782,469 | 1/1974 | Fulford ................................... 166/279 |
| 4,291,763 | 9/1981 | Singer .................................... 166/110 |
| 4,456,067 | 6/1984 | Pinner ..................................... 166/279 |
| 4,660,645 | 4/1987 | Newlove ................................. 166/304 |
| 4,670,166 | 6/1987 | McDougall ......................... 166/278 X |
| 5,196,124 | 3/1993 | Connor et al. ......................... 166/279 |
| 5,322,121 | 6/1994 | Hrachovy .............................. 166/279 |

FOREIGN PATENT DOCUMENTS

| | | |
|---|---|---|
| 0193369 | 9/1986 | European Pat. Off. . |
| 0416908 | 3/1991 | European Pat. Off. . |
| 0543358 | 5/1993 | European Pat. Off. . |
| 1799893 | 3/1993 | U.S.S.R. . |
| 2284223 | 5/1995 | United Kingdom . |

OTHER PUBLICATIONS

R.J. Powell et al, "SPE 28999 Controlled–Release Scale Inhibitor for Use in Fracturing Treatments," 1995, Society of Petroleum Engineers; SPE International; pp. 571–579.

Derwent Database WPI, AN 94–158056, Week 9419, relating to SU 1,799,893.

*Primary Examiner*—George A. Suchfield
*Attorney, Agent, or Firm*—William R. Hinds

[57] ABSTRACT

Chemical treatment agents are supplied to a well or borehole extending through an earth formation by subjecting the well to a fracturing treatment with a high pressure fluid and proppant particles. The proppant particles are thereby trapped in fractures in the earth formation. Some or all of the proppant particles are of porous insoluble inorganic material, and are impregnated with a chemical treatment agent, such as a scale inhibitor or a corrosion inhibitor. The porous particles may be of a ceramic or oxide material, for example a silica and/or an alumina-based material.

11 Claims, No Drawings

WELL TREATMENT

This invention relates to a method for treating a well such as an oil well, to supply chemical treatment agents to it. Such chemicals may for example inhibit scale formation, corrosion and/or other deleterious processes.

For many oil wells the composition of the fluid or fluids in or adjacent to the well is such that it is beneficial to add to the fluid a material to inhibit deleterious properties which the fluid would otherwise exhibit. For example the fluids may be corrosive to the well casing so a corrosion inhibitor would be added. It is consequently well known to add material to an oil well to inhibit deleterious processes; such material may be injected as a liquid, or as described in EP 0 193 369 (Exxon) it may be provided in a polymer bead from which it leaches out into the well fluid. In the case of water wells too there may be a need to supply water treatment chemicals to the well.

According to the present invention there is provided a method of treating a well so as to supply a chemical treatment agent, the method comprising subjecting the well to a fracturing treatment with a high pressure fluid and proppant particles, wherein at least some of the proppant particles comprise a porous, insoluble, inorganic material of porosity no more than 30% containing the chemical treatment agent in a form such that the chemical treatment agent then gradually leaches out into the well fluids over a prolonged period.

The porous proppant particles may be sufficiently strong to be used on their own, though they may be used in conjunction with proppant particles of non-porous material such as sand. Once injected into the formation the porous particles act as a reservoir of the chemical treatment agent, which gradually leaches out into the well fluids over a period which is preferably several months and for some chemical treatment agents is preferably more than a year for example between 3 and 5 years. Typically the resulting concentration of the chemical in the well bore is in the range 1 to 50 ppm, for example 10 ppm. The term "insoluble" means that the particles are not soluble in the well fluids (e.g. water, brine, or oil) under the conditions found in the well, which typically means at temperatures no higher than 250° C. and pressures no higher than about 80 MPa. Because they are insoluble they continue to act as proppant particles even after all the chemical treatment agent has leached out. The porous particles might be of inorganic oxide or ceramic, for example of an aluminium silicate, silicon carbide, alumina, or silica-based material. In particular the particles might be porous beads of silica- or alumina-based material of size in the range 0.3 mm to 5 mm, preferably between 0.5 and 2 mm, for example about 0.5 mm or about 1 mm, which might be made by a number of production routes for example a sol-gel process, electrofusion, spray-drying, pelletisation and chemical and/or thermal modification of proprietary products. They may have a porosity in the range 5% to 30%, for example about 12% or 18%. They are preferably of spherical shape.

It is desirable for the porous particles to comply with the API specification for proppant material. This specifies criteria for particle shape, for acid resistance (in 12% HCl and 3% HF solution), and for crush resistance. The particles of the present invention can be strong enough to withstand crushing at pressures above 1000 psi (6.9 MPa), for example above 3000 psi (21 MPa), for example up to 6000 psi (41 MPa). The API criterion for crushing strength depends on the particle size; for example particles of size 20–40 mesh (0.42–0.84 mm) must not lose more than 2% by mass at a closure pressure of 4000 psi. It does not appear to be feasible to make sufficiently strong particles at porosities above about 30%.

The invention will now be further described by way of example only. Where it is desired to enhance the permeability of oil-bearing strata in the vicinity of an oil well, it is known to inject a fluid into the well such that the pressure at the depth of those strata is sufficient to cause cracking or fracturing of the rocks of the strata. The fluid injected into the rocks may contain a dissolved polymer which may be cross-linked to form a gel (so it is of high viscosity), and may include particles of solid material such as sand which are carried into the fractures by the injected fluid. The gel subsequently breaks down, and the particles prevent the fractures closing when the pressure is reduced. Such particles may be referred to as proppant particles. One such fracturing fluid, for example, is described in GB 2 172 007 (Nitto Chemical) and contains guar gum or a derivative of it and a stabilizing compound, while a method for controlling the growth of upward vertical fractures during a hydraulic fracturing process is described in GB 2 137 262 (Dow Chemical).

In the present invention some or all of the proppant particles are porous, and are impregnated with material which, in the case of an oil well, might be scale inhibitor or corrosion inhibitor. They might be for example, porous silica and/or alumina spheroids, and might be made by a number of production routes, for example a sol-gel process, electrofusion, spray-drying, pelletisation and chemical and/or thermal modification of proprietary products.

Such porous silica particles might be made of material made by the method described in GB 1 567 003, that is by dispersing solid primary particles of silica (produced by a vapour phase condensation method) in a liquid to form a sol, forming droplets of the sol, and drying the droplets to form porous gel spheres. For example silica powder produced by flame hydrolysis and consisting of primary particles of diameter 27 nm were added to water to give a concentration of 100 g/litre, rapidly stirred, and then 100 ml of 0.125 M ammonium hydroxide added to a litre of mixture. This gave a sol in which there were aggregates of the primary particles, the aggregates being of diameter about 0.74 $\mu$m. If it is dried to form a gel the porosity may be 80%.

As described in GB 1 567 003, similar sols can be made from alumina powder produced by flame hydrolysis, or from flame hydrolysed titania. When dried, the resulting gels are porous. Furthermore the porosity remains high when the gel is heated to form a ceramic, as long as the temperature is not raised too high—in the case of the alumina gel it must not exceed about 1100° C. Such high porosity material provide a large surface area and pore space for beneficial chemical agent deposition. The porous gel particles may be mixed with non-porous material such as clay, before being fired to form spheroids of a desired porosity. The porosity of the spheroids is also affected by the firing procedure.

An alternative method for making a porous material is that described in GB 2 170 189 B, in which an organic compound of the appropriate element (e.g. silicon) in dispersed form is hydrolysed, in the presence of a protective colloid. The protective colloid might for example be a polyvinyl alcohol, or a water-soluble cellulose ether. For example a mixture of 40 ml ethyl silicate (i.e. tetraethoxysilane) and 20 ml n-hexanol was added as a thin stream to a stirred aqueous ammoniacal solution of polyvinyl alcohol (50 ml of 5 percent by weight polyvinyl alcohol and 200 ml of 0.880 ammonia) and stirred for half an hour. Small droplets of organic material are dispersed in the aqueous solution, and gel due to hydrolysis. The mixture was then poured into 1 litre of distilled water and left to settle overnight. The supernatant liquid was decanted, the residue re-slurried in 500 ml of distilled water, and steam passed into it for an hour. The suspension was then filtered. The product was microspheroidal silica gel particles smaller than 90 $\mu$m.

EXAMPLE 1

A method of making porous particles of various shapes, such as round ended cylinders or spherical beads suitable for use as proppant particles is as follows:

(i) Ball clay (500g of dry clay) is dispersed in 12 liters of water, then 4500g of flame-hydrolysed silica powder is suspended in the dispersion, and water added to give a total volume of 15 liters. The suspension is spray-dried by disc atomisation to produce a gel powder with particles about 5 $\mu$m to 25 $\mu$m in diameter.

(ii) A mixture is made of 630 g of the gel powder of stage (i), with 70 g of dry ball clay, 630 g of water, and 300 g of starch (PH101 Avicel). this mixture has the requisite rheology for extrusion, and the added clay gives stronger beads. The mixture is extruded through a profile screen, and the extruded lengths are spheronised (in a NICA SPHERO-NISER S 320) to give particles with the desired shape characteristics. These shaped beads are dried in a fluidised bed dryer, and subsequently fired, typically to 1000° C., to produce porous silica-based ceramic beads, of about 20% porosity, typically about 1 mm in diameter.

(iii) The porous beads are placed in a pressure vessel, and the vessel evacuated to about 1 mbar (100 Pa) absolute to remove air from the pores. The vessel is then filled under vacuum with a solution of a diethylene-triamine penta (methylenephosphonic acid) -based scale inhibitor (15% by volume of inhibitor, in distilled water containing 2000 ppm $Ca^{++}$ in the form of chloride, at pH 5), and the pressure raised to 200 atm (20 MPa). The vessel is heated to 93° C. to promote inhibitor adsorption and precipitation within the porous beads, while being kept at constant pressure, and left in this state for 24 hours. The vessel is then depressurised, drained, and cooled, and the beads removed.

(iv) Water is then removed from within the porous beads by a freeze drying process which produces a dry and easily handled material. This drying procedure allows the impregnation process (iii) to be repeated, to retain still more inhibitor within the pores of the beads.

(v) The dry, impregnated beads may then be coated with a permanent, porous film and/or a non-permanent, non porous coating to control the release of the impregnated chemical treatment agent during bead placement and use.

EXAMPLE 2

An alternative method of making porous beads suitable for use as proppant particles is as follows:

(i) Finely ground bauxite ($Al_2O_3.3H_2O$) and mullite ($Al_6Si_2O_{13}$) are mixed with water to give a slurry, and this is spray-dried using a NIRO spray drier, giving particles approximately spherical in shape, and of sizes up to about 1 mm diameter. The dried particles are then sintered to a temperature in the range 870° to 1500° C. The resulting porosity can be between 10% and 20% depending on the firing conditions, for example 12%.

(ii) Concentrated scale inhibitor is made from a commercially-available diethylene-triamine penta (methylenephosphonic acid)-based scale inhibitor (initially about 25% active material), by first adding to this inhibitor 5000 to 25000 ppm cations ($Ca^{++}$ and $Mg^{++}$) added as chlorides, preferably 12000 to 25000 ppm, and then distilling under vacuum to about half the initial volume.

(iii) The porous sintered beads are placed in a pressure vessel, and the vessel evacuated to about 0.1 mbar (10 Pa) absolute to ensure no air or vapours remain in the pores. The vessel is then filled under vacuum with the concentrated inhibitor. The temperature is held at 60° to 70° C. After 1 hour the vacuum is released, the vessel drained, and the wet beads removed.

iv) The wet beads are then dried in an oven or a fluidized bed.

It will be appreciated that the porous particles may be of different sizes and shapes to those described above, and may be of a wide range of different inorganic materials. It will also be appreciated that the porous particles may be produced by processes other than those described above. Furthermore some or all of the porous particles may contain oil field chemicals different from the inhibitor material discussed above. For example some or all of the particles might contain hydrogen sulphide scavenging materials, hydrate inhibitors, corrosion inhibitors, wax, asphaltene and other organic deposition inhibitors, biocides, demulsifiers, other types of scale inhibitor and any other oil field treatment chemical. By injecting porous proppant particles containing different chemicals, a variety of different deleterious processes can be simultaneously suppressed. Where the method is applied to wells producing other fluids, such as water wells, then different treatment chemicals would be provided.

We claim:

1. A method of treating a well extending through a subterranean formation so as to supply a chemical treatment agent, the method comprising subjecting the well to a fracturing treatment with a high pressure fluid and proppant particles so fractures are formed in the formation and the proppant particles are carried into the fractures, wherein at least some of the proppant particles comprise rounded beads of a porous, insoluble, inorganic material of porosity no more than 30% containing a water-soluble chemical treatment agent precipitated from an aqueous solution in a form such that the chemical treatment agent then gradually leaches out into the well fluids over a prolonged period.

2. A method as claimed in claim 1 wherein the porous proppant particles comprise a material selected from inorganic oxide and ceramic.

3. A method as claimed in claim 1 wherein the porous proppant particles consist primarily of a material selected from aluminium silicate, silicon carbide, alumina, and silica.

4. A method as claimed in claim 1 wherein the porous proppant particles are porous beads of size in the range 0.3 mm to 5.0 mm.

5. A method as claimed in claim 4 wherein the beads are of size in the range 0.5 mm to 2.0 mm.

6. A method as claimed in claim 1 wherein the porous proppant particles are sufficiently strong to withstand crushing at pressures up to 21 MPa.

7. A method as claimed in claim 6 wherein the porous proppant particles can withstand crushing at pressures up to 41 MPa.

8. A method as claimed in claim 1 wherein the well is treated simultaneously with a plurality of different chemical treatment agents by subjecting the well to the said fracturing treatment, the porous proppant particles containing the different chemical treatment agents.

9. A method as claimed in claim 1 wherein at least some of the porous proppant particles contain scale inhibitor dried in the presence of divalent cations.

10. A method as claimed in claim 9 wherein the divalent cations include $Ca^{++}$ ions.

11. A method as claimed in claim 10 wherein the divalent cations also include $Mg^{++}$ ions.

* * * * *